E. P. NOYES.
PRESSURE CONTROLLED FLUID REGULATOR.
APPLICATION FILED JUNE 24, 1910.
991,229.
Patented May 2, 1911.
2 SHEETS—SHEET 1.
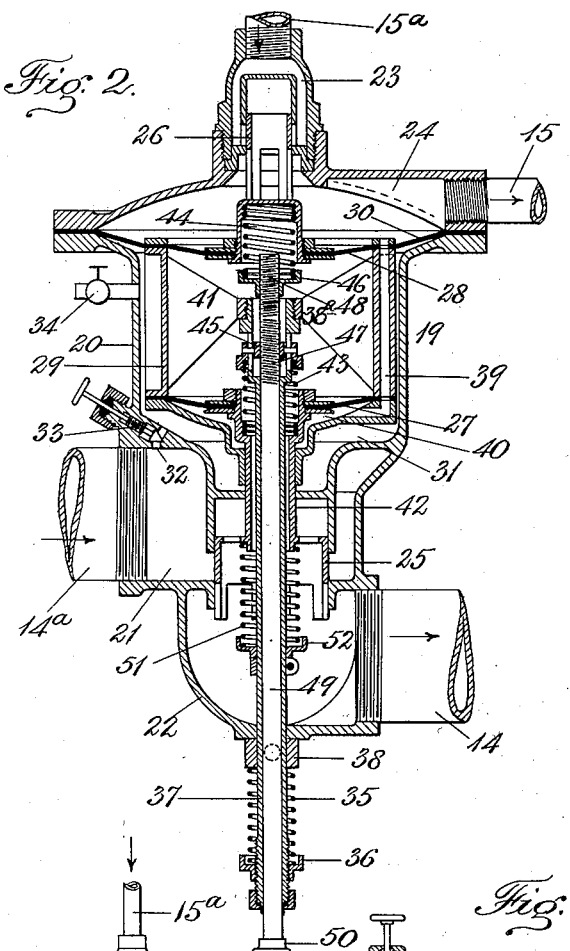
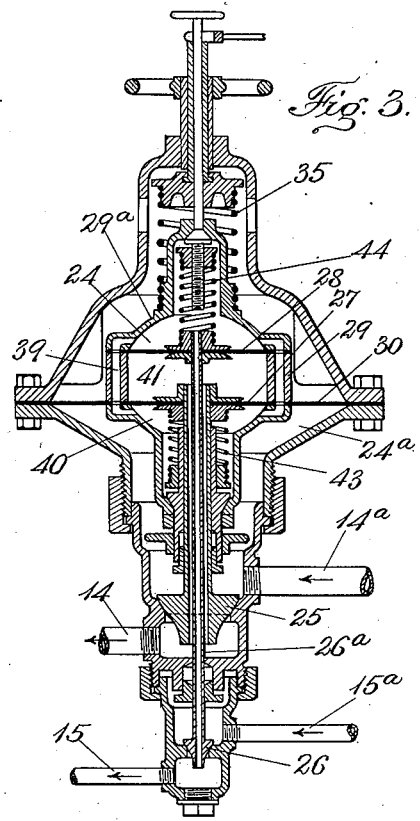
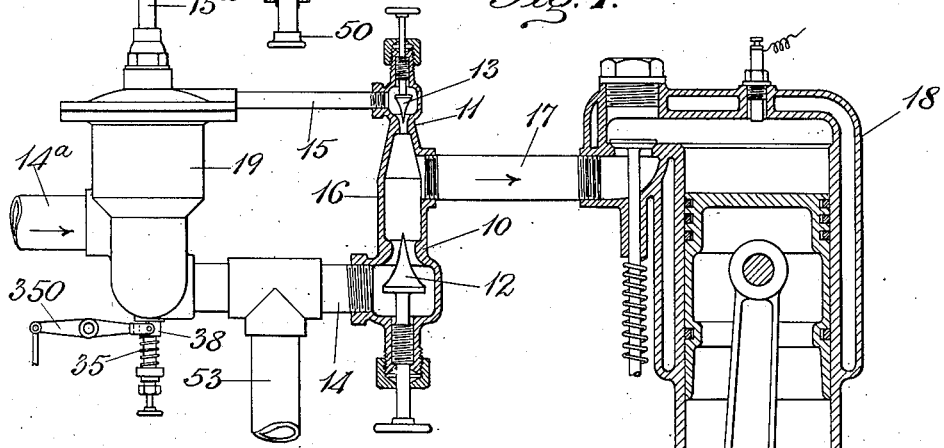
Witnesses:
G. Blake
J. E. Nares.
Inventor:
E. P. Noyes
by Robert McPierson, atty.

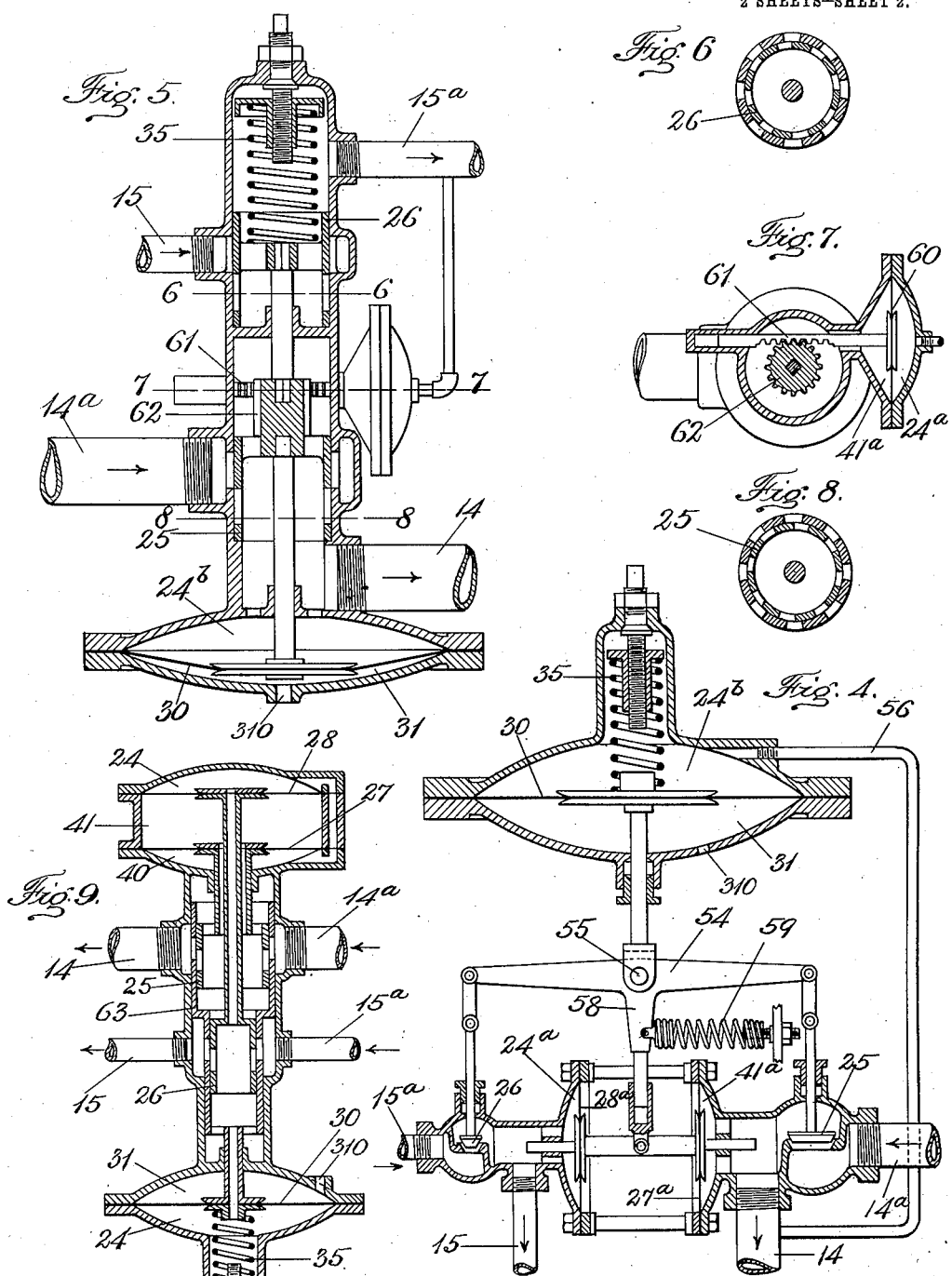

UNITED STATES PATENT OFFICE.

EDWARD P. NOYES, OF WINCHESTER, MASSACHUSETTS, ASSIGNOR TO C P POWER COMPANY, OF NEWARK, NEW JERSEY, A CORPORATION OF NEW JERSEY.

PRESSURE-CONTROLLED FLUID-REGULATOR.

991,229. Specification of Letters Patent. Patented May 2, 1911.

Application filed June 24, 1910. Serial No. 568,629.

*To all whom it may concern:*

Be it known that I, EDWARD P. NOYES, a citizen of the United States, residing at Winchester, in the county of Middlesex and State of Massachusetts, have invented certain new and useful Improvements in Pressure-Controlled Fluid-Regulators, of which the following is a specification.

This invention relates to the automatic proportioning and quantity-control of a plurality of aeriform fluids, such for example as air and fuel gas which it may be desired to maintain in a combustible ratio for explosive or other gas engines. When the fluids have a substantially constant initial pressure such as that of atmosphere and a gas supply derived from city mains or a producer, the problem of properly proportioning their quantities is mainly a question of adjusting the relative orifices of suitable hand or governor-controlled regulating valves in the air and gas pipes respectively, and if variable throttling is desired for engine-control, it may be had, as is well known, either by means of a separate throttle-valve in the mixture-pipe, or by conjointly varying the total air and gas control ports without changing their relative areas. But such expedients are ineffective where the initial pressure of either fluid varies considerably, or is substantially above or below the atmospheric level, or where either or both of the fluids is derived through a plurality of pipe inlets, as for example where the gas-engine acts as a vacuum pump and takes a part of its air through a vacuum-using appliance.

It is the object of my invention to provide simple and reliable regulating mechanism for meeting such conditions as these, or any other conditions where a plural-fluid regulator of a universal character is needed, and the plan which I have devised is that of establishing suitably-related resistance-orifices in the respective fluid pipes, merging said pipes into a single chamber or mixture-conduit posterior to the orifices, and employing automatic regulating devices in the anterior sections of said pipes, which shall respond to the relative pressures and preferably also to the absolute pressures therein so as to proportion the quantities and, if desired, to automatically maintain a standard pressure-level of the fluids anterior to the resistance orifices. These regulating devices may be made capable of throttling the fluids in parallel and in varying degrees at will or under the influence of a governor in order to control the motor.

My invention consists in the improved construction of an automatic pressure-responsive regulator for these or analogous duties, as well as in combining its functions with the pipes and orifices in the manner above indicated, all as more particularly ascertained in the following description.

Of the accompanying drawings, Figure 1 represents a view in side elevation and section showing my invention applied to an explosive engine. Fig. 2 represents a vertical section of a preferred form of the regulator. Fig. 3 represents a vertical section of a modified regulator. Fig. 4 represents a vertical section showing a second modification. Fig. 5 represents a similar view showing a third modification. Figs. 6, 7, and 8 represent sections on the lines 6—6, 7—7, and 8—8 of Fig. 5. Fig. 9 represents a vertical section showing a fourth modification.

For convenience the fluids will be referred to as air and fuel-gas, although the invention is not confined to these fluids or to use as an explosive-engine governor.

The principle of the invention may be carried out as illustrated in Figs. 1 and 2, by disposing a pair of suitable resistance members or orifices 10, 11 of normally fixed aperture, in the air and gas conduits 14, 14$^a$ and 15, 15$^a$ respectively—these orifices being preferably adjustable by means of the hand valves 12, 13—merging said conduits into a common mixture-pipe or chamber 17 on the posterior sides of the orifices so as to equalize the two fluid pressures immediately beyond them, and locating in the anterior sections of these conduits suitable regulating mechanism which as here shown is designated as a whole by the numeral 19, for controlling the pressures in 14 and 15. By construction, or by adjustment of the valves 12, 13, the orifices 10, 11 may be related in a manner corresponding to the combustible proportions of air and the particular fuel-gas which is being handled. The absolute quantities of fluid flowing through fixed orifices of short length depends upon the areas of these orifices, the pressures of the fluids anterior and posterior thereto, and the temperatures of the fluids which latter factor may in general be assumed to be constant or nearly so.

Since the orifices are assumed to be fixed in approximately the desired ratio, and the pressures posterior to the orifices are equalized, it follows that if the pressures in 14 and 15 are, by the action of the automatic regulating means, maintained in a fixed relation such as that of equality either at a fixed or at a variable pressure-level, the desired quantity-ratio of the two fluids will be substantially maintained regardless of the pressures of either of the fluids admitted to the regulator 19. This arrangement also permits the side inletting of air or gas between the regulator and the fixed orifices without disturbing the ratio.

The regulator for automatically maintaining the desired pressure relationship and pressure level in the conduits may be of any suitable character, but I have devised and claimed as a part of my invention a preferred form of regulator represented in detail in Fig. 2 and susceptible of modification as hereinafter indicated. For the purpose of further description the terms "anterior" and "posterior" will be referred to the regulator 19 rather than to the orifices 10, 11 unless otherwise specified.

In Fig. 2, 20 is a casing having inlet and outlet chambers 21, 22 into and from which the sections 14ª and 14 of the air conduit proceed, and corresponding chambers 23, 24 for the gas conduit 15ª, 15.

25, 26 are air and gas valves of the sleeve or piston type provided with suitable ports which are carried, by an axial motion of the respective valves, into and out of register with the inlet chambers 21 and 24, these valves being respectively attached to two pressure-balance diaphragms 27, 28 which are themselves carried by a box 29 forming the hub of a third or pressure-level diaphragm 30. The diaphragm 30 imposes a concurrent motion upon the two valves under the influence of the posterior pressure of one of the fluids acting in a chamber 24 above said diaphragm, and the diaphragms 27, 28 impose an opposite or reciprocal motion upon the valves under the influence of the two posterior pressures balanced against each other, so as to control the relation of said pressures in the face of any tendency of either of them to vary independently of the other. It will be evident that if the pressure in chamber 24 be opposed by a constant pressure such as that of the atmosphere in the chamber 31 below the diaphragm 30, said diaphragm and the valves 25, 26 will act as a reducing-valve mechanism responsive to the absolute pressures of the fluids in the conduit sections 14, 15. In some situations, however, it may be desired to have them responsive to the volume of fluid flow but not to the absolute pressure, as for example in some cases where the initial pressures are above atmospheric, and this may be accomplished by establishing in chamber 31 the initial pressure of one of the fluids instead of atmospheric pressure (although the two are the same in the case of air taken in through the regulator at atmospheric pressure). The tendency will then be to maintain pressures in the posterior sections 14, 15 of the conduits lower than the anterior pressures by a substantially constant difference. Thus Fig. 2 represents a duct 32 leading from the anterior air-pressure chamber 21 to the chamber 31 and controlled by a stop-valve 33, and another valved air-inlet 34 leading from chamber 31 to the atmosphere. Thereby either the atmospheric pressure or the initial air pressure may be established in chamber 31, or the ducts 32 and 34 could have their valves adjusted to establish in 31 a mean between the pressure in 14ª and that of the atmosphere. Thus, with both passages 32 and 34 open there will be a flow of air through chamber 31 either inwardly to or outwardly from chamber 21, depending upon whether the pressure in the latter is below or above atmosphere, and if this flow be choked or restricted in both of said passages, the aforesaid mean pressure will exist in chamber 31.

It is a matter of convenience to have the posterior gas pressure as the pressure which acts in chamber 24 on the upper side of diaphragm 30. The pressure so acting might be either the posterior gas-pressure or the posterior air-pressure, since these are by the action of diaphragms 27, 28, maintained in an equal or controlled relationship. Where the desired difference of pressure between the anterior and posterior sections 14ª, 14, and 15ª, 15 of the two conduits, or between the atmosphere and the posterior sections, is greater than that which would be due to the weight of the valves and their connections, a spring 35 may be provided to act on an adjustable collar 36 carried by a sleeve 37 which connects with a spider 38ª forming a part of the box 29. The pressure of this spring added to the weight of the parts will then determine the reduction of pressure in conduit 15 at which diaphragm 30 will begin to rise and open the valves 25, 26.

38 is a collar forming the upper seat of spring 35 and permissibly made slidable along sleeve 37 in case it is desired to impose some external governing influence upon the spring 35 so as to vary the critical pressure level, a lever 350 being shown in Fig. 1 for the purpose of shifting this collar and thus variably throttling the flow of air and gas without disturbing their proportions.

The diagram 28 is subject on its upper side to the posterior gas pressure in chamber 24 tending to close the gas valve 26, and this pressure is also led through passages 39 in the walls of box 29 to a chamber 40 on the under side of diaphragm 27, thereby tending to open the air valve 25. In the chamber 41 between these two diaphragms is established the posterior air pressure through the hollow stem 42 of the air valve, and this pressure tends to open the gas valve and close the air valve.

If the weights of the diaphragms 27, 28 and their valves are exactly balanced, it is evident that the posterior air and gas pressures in conduits 14 and 15 will remain substantially equal, because for example if the air pressure should begin to exceed the gas pressure the diaphragms would be spread and the air valve 25 would decrease its opening, and gas valve 26 increase its opening until equality was restored. If the gas pressure should begin to exceed the air pressure the opposite action would take place, air valve increasing and gas valve decreasing its respective opening. If however the weights of the valves and the pressure-balance diaphragms are not exactly counteracted, the posterior pressures of the two fluids will tend to remain in a determinate relationship other than that of equality, and this condition I provide for by means of the springs 43, 44, each of which is adjustable for either tension or compression, the spring 43, when in compression, bearing downwardly on the stem of the air valve 25 and the spring 44 in like case bearing upwardly on the stem of the gas valve 26. The inner ends of these springs are attached to nuts 45, 46 working on left and right hand threads 47, 48 on a vertical floating rod 49 which is mounted in the sleeve 37 and has a turning knob 50 at its lower end, whereby the two springs may have their pressures adjusted concurrently. Normally the friction of this rod in the hollow stem 37 holds it against endwise movement therein, but when desired it may be slid lengthwise in the stem to alter the pressures of the springs 43, 44 reciprocally, with corresponding effects on the pressure-relationship of the fluids in 14 and 15.

In order to balance the weights of the diaphragms 27, 28 and their valves, I provide a third spring 51 seated against an adjustable collar 52 on the sleeve 37, and pushing upward directly upon the air valve 25 and indirectly through the springs 43 and 44 upon the gas valve 26. Assuming that this spring 51 is adjusted so as to exactly balance the weights, it is evident that the springs 43 and 44 can act unhampered by the weights to create either a preponderance of gas pressure, or a preponderance of air pressure, or equality of pressures. If it is desired to have the gas pressure predominate, the rod 49 will be turned so as to spread apart the nuts 45, 46, and if it is desired to have the air pressure predominate, said rod will be turned to draw these nuts toward each other until the compression of the springs is changed into a tension. When these springs have no pressure in either direction other than that which sustains the weight of the upper valve and diaphragm, the gas and air pressures will be maintained equal. It will now be evident that whenever the pressure in the pipes 14 and 15 tends to rise above that for which the spring 35 is adjusted, as for example if the suction of the motor 18 should decrease, the diaphragm 30 will tend to descend and decrease the opening of both valves 25, 26 until the standard or critical pressure has been reëstablished, and if the suction of the motor is so great as to draw down the pressures in 14 and 15 below standard, the diaphragm 30 will rise and increase the opening of the two valves. If such pressure-level controlling action disturbs the pressure relationship in pipes 14, 15, the diaphragms 27, 28 will automatically compensate in the manner described. Of course, if either of the diaphragms 27 or 28 were a rigid plate, the relative openings of the two valves would still be controlled by the difference between the two posterior pressures, through the movements of one of the valves instead of by their reciprocal movements. The conjoint control of the valves would remain as before and the regulator would perform its functions, though less delicately.

While, as pointed out above, it is not essential to the quantity-proportioning action of the regulator that the pressures in 14 and 15 shall stand at a constant level, this mode of action, attained by installing the atmosphere or other constant pressure in chamber 31, is highly useful in connection with a gas-engine employed as a vacuum pump or in other situations where stability of pressures either above or below the atmospheric level is desired, and the regulator under these circumstances serves to govern the speed of the engine with which it may be connected if the latter performs only pumping work. Whether the chamber 31 contains a constant pressure or the anterior pressure of one of the fluids, the regulator in either case is responsive to the total volume of fluid flow, and this is important since the pressure-balance diaphragms in the illustrated embodiment of my invention are deprived of that function.

This regulating apparatus, as stated, enables the motor 18 to act as an air pump for performing extraneous work by suction, such for example as the vacuum cleaning of carpets etc., and the entire air supply of the motor could, under such conditions, be led through the anterior section 14ª of the main air conduit, but in that case the motor would stop if the air supply at the vacuum-using device were entirely shut off. I therefore prefer to provide an auxiliary branch air inlet 53 connecting with the main air conduit between the regulator 19 and the orifice 10 and connected at its other end with the vacuum apparatus (not shown). The regulator will then in addition to its functions as above described, serve to automatically prevent the total cessation of air and gas supply to the motor. Although the air led in through the branch pipe 53 is not directly controlled by the regulator, the latter will nevertheless maintain the proper proportions of air and gas going to the motor within the limits of its regulative capacity by the exertion of its automatic pressure-level-determining and pressure-balancing functions as described.

Fig. 3 shows a modified construction divided from my co-pending application Serial No. 275,861, filed August 26, 1905, of which the present application may be deemed in part a continuation. In this and the other modification views, like characters are used to designate parts similar in function to those represented in Fig. 2. The air and gas valves 25, 26 are conical and both mounted at the lower end of the regulator, the posterior gas pressure being carried up to chambers 24 and 40 through the hollow stem 26ᵃ of the gas valve, and the box 29 has a cover 29ᵃ forming the top wall of chamber 24. The push-and-pull springs 43 and 44 in this case are designed to sustain the weights of the valves 25, 26 and their connections, besides acting as adjusters of the pressure relationship between the two fluids. The spring 35 is located in the upper part of the regulator and presses downwardly to close the two valves as before, being aided by atmospheric pressure acting on the upper side of diaphragm 30, to which is opposed the anterior air pressure acting in a chamber 24ᵃ underneath diaphragm 30. The tendency of this form of the regulator is therefore to automatically open the valves 25 and 26 whenever a certain pressure is reached in the anterior section 14ᵃ of the air conduit and to maintain an equal or controlled relationship between the pressures in the posterior sections 14, 15 of the conduits, but obviously this form of construction can be suitably modified to perform the same functions as the regulator shown in Fig. 2.

As a further modification I have, in Fig. 4, represented the air and gas valves 25, 26 attached to opposite arms of a floating lever 54 whose fulcrum 55 is carried by the pressure-level diaphragm 30, the latter having the adjustable spring 35 pressing downwardly to close the valves and having also the chambers 24ᵇ and 31 on opposite sides of it receiving through conduit 56 and aperture 310 the posterior and atmospheric air-pressures respectively. A third arm 58 of lever 54 is oppositely acted on by two balance-diaphragms 27ᵃ, 28ᵃ receiving respectively the posterior air and gas pressures in chambers 41ᵃ, 24ᵃ. Therefore when the posterior pressure of either fluid becomes excessive the valve for that fluid will tend to close and the other valve to open. If the pressure level varies from the standard the diaphragm 30 will compensate by acting on both valves concurrently. A push-and-pull spring 59 acting on the lever 54 is adapted to perform the functions of the springs 43 and 44 of Fig. 2 in establishing a pressure relationship other than that of equality between the conduit sections 14, 15. This form of the invention is in effect a two-diaphragm arrangement in which the pressure-balance diaphragm is for convenience made in two parts so as to afford a connection with the lever 54 without the use of a stuffing box.

In the modification shown in Figs. 5 to 8, the same results are obtained by a combined axial and rotary movement imparted to a piston-valve structure, the axial movement being imparted by the pressure-level diaphragm 30 which moves the valves 25, 26 up and down so as to cut off the air and gas ports in equal proportion, while the rotatory motion is imparted by a pressure-balance diaphragm 60 acting on the valves by a rack 61 and pinion 62 to control the ports reciprocally. If posterior air pressure in the chamber 41ᵃ on one side of this diaphragm predominates over the posterior gas pressure in chamber 24ᵃ on the opposite side, the air ports will tend to close and the gas ports to open wider, while if the gas pressure should predominate, the opposite effect will take place.

It is not essential that the pressure-balance and pressure-level controls shall both be exerted upon the same valve members. For example one control may be imposed upon the valves and the other upon their seats or bushings as represented in Fig. 9 which has the balance diaphragms 27, 28 attached to the air and gas valves 25 and 26 respectively and subject to the same pressures as in Fig. 2, while the pressure-level diaphragm 30 is attached to a separate bushing 63 having ports movable into and out of register with those of the valves. Should the posterior gas pressure in chamber 24 on the under side of diaphragm 30 and that of spring 35, both acting upwardly on the bushing 63, tend to exceed the weight of said bushing and diaphragm together with the atmospheric pressure acting downwardly in chamber 31 on the upper side of said diaphragm, the bushing will rise and close the air and gas ports proportionately and the opposite action will take place when the posterior gas pressure tends to fall. When the posterior pressure of either of the fluids is in excess of the other, the corresponding valve will be moved toward closure and the other valve further opened as in the previously described embodiments of my invention. Where both members of the valve couple, *i. e.* the valve and its seat, are movable, it is of course immaterial which is regarded as the valve.

The springs for varying the pressure relationship of the two fluids are for the sake of simplicity omitted in Figs. 7 and 9.

In any of the modifications above described it is obviously permissible to establish in chamber 31 some other pressure than that of the atmosphere, as already indicated in connection with Fig. 2. Various other changes may be made within the scope of my invention.

I claim,—

1. In fluid-pressure regulating apparatus, the combination of a plurality of aeriform-fluid conduits having constrictions, a mixture-conduit into which they merge, and means responsive to the pressure level and the pressure difference in the first-said conduits anterior to the said constrictions for maintaining the fluid pressures in a predetermined relation and at a predetermined level.

2. Apparatus for automatically proportioning and regulating aeriform fluids comprising a plurality of conduits for the respective fluids having constrictions, a mixture conduit into which they merge, pressure-controlled valve devices in the respective conduits anterior to said constrictions adapted to maintain the fluid pressures in a predetermined relation and also responsive to the joint volume of flow in the conduits, and means for adjusting the closing tendency of said devices to vary the amount of throttling automatically maintained thereby.

3. In combination, a plurality of fluid-pressure conduits having constrictions, a mixture conduit into which they merge, automatic regulating mechanism responsive to the pressures in said conduits between itself and the constrictions for maintaining said pressures in a predetermined relation, and a branch inlet-conduit connected to one of the first-said conduits between the constriction therein and the regulating mechanism.

4. A fluid-pressure regulator comprising two valve devices for separate fluids, means for controlling the relative openings of said devices by the difference between the pressures of the two fluids, and means controlled by the pressure of one of the fluids for operating said devices concurrently.

5. A fluid-pressure regulator comprising two valve devices for separate fluids, means for operating said devices reciprocally by the difference between the pressures of the two fluids, and means controlled by the pressure of one of the fluids for operating said valve devices concurrently.

6. A fluid regulator comprising two fluid conduits, two valves controlling ports in said conduits, a septum structure connected with the valves and operated by the difference in pressure between the fluids posterior to said valves for reciprocally opening and closing the latter to maintain said pressures in a predetermined relationship, and a second septum structure controlling the valve-ports concurrently and subject to the posterior pressure of one of the fluids for determining the level of the posterior pressures.

7. A regulator comprising two fluid conduits having valve-ports, valve-devices controlling said ports, a septum controlling said valve-devices and subject on one side to the pressure of one of the conduits posterior to its port and on the other side to a substantially constant pressure, and a septum-structure subject in opposite directions to the posterior pressures of said conduits and reciprocally controlling the respective valve-ports.

8. A quantity-proportioning and pressure-level controlling device for air and combustible gas comprising conduits for the respective fluids having constrictions, a regulator comprising two valve devices for the respective conduits located at points anterior to the constrictions, means for operating said devices reciprocally by the difference in the conduit pressures between said valve-devices and constrictions, means controlled differentially by one of said pressures and the atmospheric pressure for operating said devices conjointly, and a branch air-pipe connecting with the air conduit between the valve-device and the constriction therein.

9. A fluid-pressure regulator comprising conduits for two aeriform fluids, two valves controlling the respective conduits, two septums adapted to reciprocally operate said valves and each operated by the difference in the pressures of the two conduits, and a third septum carrying the first-said septums and subject to one of the conduit pressures.

10. A fluid-pressure regulator comprising conduits for two aeriform fluids, two valves controlling the respective conduits, two septums adapted to reciprocally operate said valves and each operated by the difference in the pressures of said conduits posterior to the valves, a third septum carrying the other two and subject in one direction to the posterior pressure of one of the fluids tending to close the valves and in the opposite direction to the pressure of the atmosphere, and a spring connected with said third septum and adapted to exert pressure tending to close the valves.

11. A fluid-pressure regulator comprising two valve devices for separate fluids, means for operating said devices reciprocally by the difference between the pressures of the two fluids, adjustable means for exerting yielding pressure on said devices in aid of one of the pressures for causing the other pressure to predominate, and means controlled by the pressures of one of the fluids for operating said devices concurrently.

12. A fluid-pressure regulator comprising two valves for separate fluids, septums connected with the respective valves and having a chamber between them open to the pressure of one of the fluids and chambers on their opposite sides open to the pressure of the other fluid, and a third septum carrying the first-said septums and subject to the pressure of one of the fluids.

13. A fluid-pressure regulator comprising two valves for separate fluids, septums connected with the respective valves and having a chamber between them open to the pressure of one of the fluids and chambers on their opposite sides open to the pressure of the other fluid, springs in the first-said chamber acting on the respective septums, means for conjointly adjusting the pressure of said springs, and a third septum carrying the first-said septums and subject to the pressure of one of the fluids.

14. A fluid-pressure regulator comprising a casing having at one end a set of chambers for the inlet and outlet of air and at the other end a set for the inlet and outlet of gas, air and gas valves interposed between the chambers of the respective sets and closing in the same direction, a pressure-level diaphragm interposed between a fluid-pressure space on its valve-opening side and the gas outlet chamber on the other side, a box carried by said diaphragm, an adjustable spring acting on said box to close the valves, a pair of pressure-balance diaphragms carried by said box and attached to the respective valves, said diaphragms having a chamber between them open to the air outlet chamber, and subject on their opposite sides to the pressure in the gas-outlet chamber, springs located in the chamber between said pressure-balance diaphragms and acting in opposite directions on the latter, nuts located between said springs and forming abutments therefor, and a rotary adjusting stem having right and left threads carrying the respective nuts.

In testimony whereof I have hereunto set my hand in the presence of two subscribing witnesses, this sixteenth day of June, 1910.

EDWARD P. NOYES.

Witnesses:
P. W. Pezzetti,
C. F. Brown.